US008817209B2

(12) United States Patent
Kuo et al.

(10) Patent No.: US 8,817,209 B2
(45) Date of Patent: Aug. 26, 2014

(54) PATTERNED RETARDER FILM AND METHOD FOR MANUFACTURING THE SAME

(75) Inventors: Chen-Kuan Kuo, New Taipei (TW); Che-Kuei Kang, Taipei (TW)

(73) Assignee: BenQ Materials Corporation, Taoyuan County (TW)

(*) Notice: Subject to any disclaimer, the term of this patent is extended or adjusted under 35 U.S.C. 154(b) by 221 days.

(21) Appl. No.: 13/548,200

(22) Filed: Jul. 13, 2012

(65) Prior Publication Data
US 2013/0107192 A1 May 2, 2013

(30) Foreign Application Priority Data

Oct. 26, 2011 (TW) .............................. 100138872 A

(51) Int. Cl.
| G02F 1/1335 | (2006.01) |
| G02B 5/20 | (2006.01) |
| G02B 5/30 | (2006.01) |
| B32B 38/06 | (2006.01) |
| G02B 27/26 | (2006.01) |
| B32B 38/00 | (2006.01) |
| B32B 37/24 | (2006.01) |
| H04N 13/04 | (2006.01) |

(52) U.S. Cl.
CPC .............. *G02B 5/201* (2013.01); *G02B 5/3016* (2013.01); *B32B 38/06* (2013.01); *B32B 2038/0076* (2013.01); *G02B 27/26* (2013.01); *B32B 2037/243* (2013.01); *B32B 2307/40* (2013.01); *H04N 13/0434* (2013.01)
USPC ........... 349/117; 349/118; 349/119; 349/120; 427/162; 156/60

(58) Field of Classification Search
USPC .............. 349/117–121, 193; 427/162; 156/60
See application file for complete search history.

(56) References Cited

U.S. PATENT DOCUMENTS

| 6,297,899 B1 * | 10/2001 | Romanovsky ................ 359/245 |
| 7,554,636 B2 * | 6/2009 | Nakatsugawa ................ 349/118 |
| 7,995,170 B2 * | 8/2011 | Onishi et al. .................. 349/114 |
| 8,264,438 B2 * | 9/2012 | Furukawa et al. .............. 345/89 |
| 2011/0292328 A1 | 12/2011 | Wu |
| 2011/0292329 A1 | 12/2011 | Huang et al. |
| 2011/0292330 A1 | 12/2011 | Huang et al. |

FOREIGN PATENT DOCUMENTS

| CN | 102213865 A | 10/2011 |
| JP | 2004-139053 | 5/2004 |
| JP | 2010-169951 A | 8/2010 |
| KR | 10-1034320 B1 | 5/2011 |
| TW | 200941091 | 10/2009 |
| TW | 201100874 A | 1/2011 |
| TW | 201129826 A | 9/2011 |

* cited by examiner

*Primary Examiner* — Huyen Ngo
(74) *Attorney, Agent, or Firm* — CKC & Partners Co., Ltd.

(57) ABSTRACT

Disclosed is a patterned retarder film which comprises a substrate, a patterned configuration layer and a liquid crystal layer. The patterned configuration layer includes a plurality of first regions and a plurality of second regions A liquid crystal layer is disposed on the patterned configuration layer, wherein liquid crystal molecules above the first regions is arranged irregularly because of the protrusions, the liquid crystal molecules above the second regions are aligned with the aligning micro-structures. The liquid crystal layer in above the first regions provides a first phase retardation, the liquid crystal layer above the second regions provides a second phase retardation, and the difference between the first phase retardation and the second phase retardation is 180°. The method for manufacturing the same is disclosed.

10 Claims, 3 Drawing Sheets

PATTERNED RETARDER FILM AND METHOD FOR MANUFACTURING THE SAME

RELATED APPLICATIONS

This application claims priority to Taiwan Application Serial Number 100138872, filed Oct. 26, 2011, which is herein incorporated by reference.

BACKGROUND

1. Technical Field

The invention relates in general to a patterned retarder film and a method for manufacturing the same, and more particularly to a patterned retarder film used in stereoscopic display systems and a method for manufacturing the same.

2. Description of Related Art

In recent years, stereoscopic display systems with enhanced image quality have been drawing more attention to the industry and become more popular to customers. It is known that applying a patterned retarder film to a liquid crystal display screen, a stereo imaging can thus be provided for the audience wearing a pair of polarization glasses.

The patterned retarder film used in liquid crystal display comprises a plurality of left-handed circular polarization zones and a plurality of right-handed circular polarization zones that are alternately disposed along a vertical direction.

During operation, light corresponding to images that are associated with the left eye (hereinafter referred to as the left-eye images) is perceived by the left eye via the left-handed circular polarization zones and the left-handed circular polarizer of the polarization glasses, and light corresponding to images that are associated with the right eye (hereinafter referred to as the right-eye images) is perceived by the right eye via the right-handed circular polarization zones and the right-handed circular polarizer of the polarization glasses. Because the left-eye images cannot pass the right-handed circular polarization zones, the left-eye images will only be received by the left eye. Similarly, the right-eye images will only be received by the right eye. Each corresponding pair of left-eye and right-eye images may combine to form a stereoscopic image showing objects having depth or three dimensions.

The prior method for manufacturing patterned retarder film comprises forming grooved and relief-like structures on a surface of a film by a grooved roller. Then, liquid crystal is coated on the grooved structures. The predetermined phase retardation can be controlled by the depth of the grooved structures. The original linear polarized light with specific direction can be transfer to left-handed circular polarized light and right-handed circular polarized light by collocating appropriate ¼ wavelength plate which has the same direction of aligning.

However, when manufacturing patterned retarder film, liquid crystal molecules are often remained on the relief-like structures because of the adhesion of the liquid crystal molecules during coating treatment. After adhering the ¼ wavelength plate, the circular polarized light will become elliptically polarized light resulted from the phase retardation caused by the liquid crystal molecules remained on the relief-like structures. The elliptically polarized light cannot be filtered by the other circular polarizer of the polarization glasses, the crosstalk interference will occur and affect the display quality of the stereoscopic display.

In view of the foregoing, an object of the present invention is to provide a patterned retarder film that is capable for alleviating the disadvantage of the prior art.

SUMMARY

The present invention is directed to a patterned retarder film for a stereographic display system and a method for manufacturing the same. According to an aspect of the present invention, a patterned retarder film is provided. In an embodiment of the present invention, the patterned retarder film comprises a substrate, a patterned configuration layer and a liquid crystal layer. The patterned configuration layer is disposed on the substrate and comprises a plurality of first regions and a plurality of second regions. The first regions and the second regions is in a grating stripe structure and is interlacedly parallel to each other, and the first regions relative to the second regions is in a relief structure. The first regions have a top surface with a plurality of protrusions having a distance of 0.1 μm to 8 μm between each of the protrusions, and the second regions have a bottom surface with a plurality of aligning micro-structures. The liquid crystal layer is disposed on the patterned configuration layer, wherein liquid crystal molecules above the first regions are arranged irregularly because of the protrusions, and the liquid crystal molecules above the second regions are aligned with the aligning micro-structures. The liquid crystal layer disposed above the first regions provides a first phase retardation, the liquid crystal layer above the second regions provides a second phase retardation, and the phase difference between the first phase retardation and the second phase retardation is 180°.

According to another aspect of the present invention, a method for manufacturing the patterned retarder film is provided.

In an embodiment of the method of the present invention, the method for manufacturing a patterned retarder film comprises the steps of providing a substrate; coating a curable resin on the substrate; embossing the curable resin to form a patterned configuration layer comprising a plurality of first regions and a plurality of second regions. The first regions and the second regions is grating stripe structure and interlacedly parallel to each other, and the first regions relative to that of the second regions is relief structure, wherein the first regions have a top surface with a plurality of protrusions having a distance of 0.1 μm to 8 μm between each of the protrusions, and the second regions have a bottom surface with a plurality of aligning micro-structures; curing the patterned configuration layer; coating a liquid crystal layer on the patterned configuration layer, wherein liquid crystal molecules above the first regions is arranged irregularly because of the protrusions; aligning the liquid crystal molecules above the second regions with the aligning micro-structures; curing the liquid crystal layer, wherein the liquid crystal layer disposed above the first regions provides a first phase retardation, the liquid crystal layer above the second regions provides a second phase retardation, and the phase difference between the first phase retardation and the second phase retardation is 180°.

The forgoing presents a simplified summary of the disclosure in order to provide a basic understanding of the present invention. This summary is not an extensive overview of the disclosure and it does not identify key/critical elements of the present invention or delineate the scope of the present invention. Its sole purpose is to present concepts disclosed herein in a simplified form as a prelude to the more detailed description that is presented later.

Many of the attendant features will be more readily appreciated as the same becomes better understood by reference to the following detailed description considered in connection with the accompanying drawings. It is noteworthy that the drawings shown in the figures are for illustrative purposes only and not to scale.

DETAILED DESCRIPTION

Figure 1:
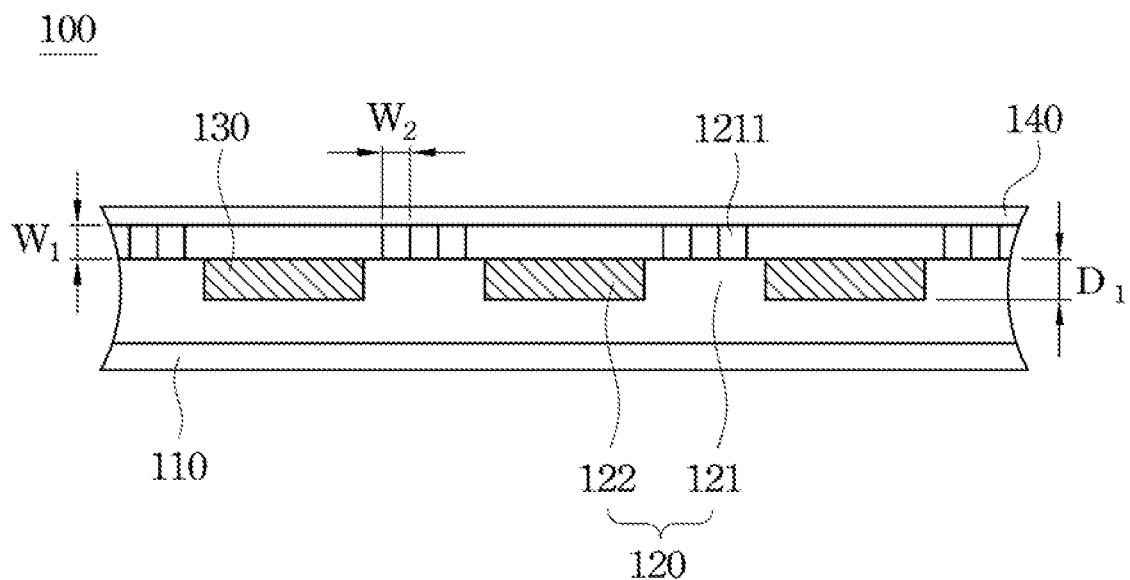
FIG. 1 is a cross-sectional view of a patterned retarder film according to an embodiment of this invention.

Accordingly, a patterned retarder film and a method for manufacturing the same are provided. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a cross-sectional view of a patterned retarder film 100 according to an embodiment of this invention. The patterned retarder film 100 is used in birefringent light valve display equipment, such as, for example, stereo liquid crystal display, to improve the occurrence of the crosstalk interference when stereo image is provided by the display. The patterned retarder film 100 shown in FIG. 1 comprises a substrate 110, a patterned configuration layer 120 which is disposed on the substrate 110 and formed by embossing a curable resin with a predetermined pattern, and a liquid crystal layer 130.

Figure 2:
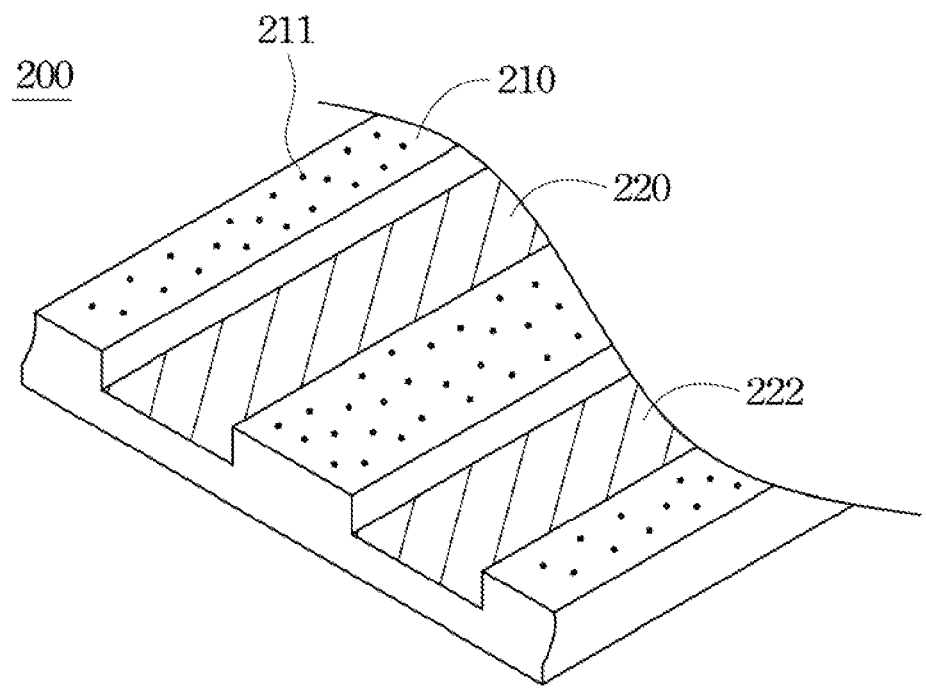
FIG. 2 is a three dimensional view of a patterned configuration layer according to an embodiment of this invention.

FIG. 2 is a three dimensional view of the patterned configuration layer 200 according to an embodiment of this invention. The patterned configuration layer 200 comprises a plurality of first regions 210 and a plurality of second regions 220, wherein the structure of the first regions 210 and the second regions 220 is grating stripe structure, which the first regions 210 and the second regions 220 are interlaced and parallel to each other, and the first regions 210 relative to the second regions 220 has a relief structure. The first regions 210 have a plurality of protrusions 211 on the top surface, the second regions 220 have a plurality of aligning micro-structures 222 on the bottom surface, and the distance between the respective protrusions 211 is in the range of 0.1 μm to 8 μm.

The liquid crystal layer 130 disposed on the patterned configuration layer 200, wherein the liquid crystal molecules above the first regions 210 arrange irregularly because of the protrusions 211, the phase retardation of the liquid crystal molecules are offset against each other thereby to form an isotropic refractive index structure. The liquid crystal molecules above the second regions 220 are aligned with the aligning micro-structures 222. Wherein the liquid crystal layer disposed above the first regions 210 provides a first phase retardation, the liquid crystal layer above the second regions 220 provides a second phase retardation, and the difference between the first phase retardation and the second phase retardation is 180°, as illustrated by FIG. 1 together with FIG. 2.

The substrate 110 is used to support the patterned configuration layer 120 and the liquid crystal layer 130, and provides appropriate mechanical properties to the patterned retarder film 100. The material of substrate 110 is penetrable by visible light. The example of the materials of substrate 110 is transparent resin, such as, for example, poly(ethylene terephthalate) (PET), polycarbonate (PC), triacetyl cellulose (TAC), poly(methyl methacrylate) (PMMA) or cyclo-olefin polymer (COP). Moreover, thermoset resin and UV curable resin such as polyurethanes, acrylic polyurethanes, epoxy resin, silicone resin, can, be used as the substrate 110. In a preferred embodiment of the present invention, due to the polarization and the durability thereof, the substrate 110 is cellulose triacetate (TAC).

The patterned configuration layer 200 is formed by embossing a curable resin. The curable resin is selected from the group consisting of a UV curable resin and a thermo-curable resin. According to an embodiment of the present invention, the material used as curable resin is penetrable by visible light preferably, such as acrylic resin, silicone and polyurethane.

In a preferred embodiment of the present invention, the patterned configuration layer 120 is formed by embossing a curable resin with a predetermined pattern by grooved roller. In brief, the surface of grooved roller has predetermined patterned structure which is transferred to the curable resin by embossing treatment to form the patterned configuration layer 120. The first regions 121 have a plurality of protrusions 1211 on the top. In a preferred embodiment of the present invention, the protrusions 1211 are cylindrical. The height W1 of the protrusions 1211 is in the range of 0.5 μm to 6 μm, the diameter W2 of the protrusions 1211 is in the range of 0.1 μm to 20 μm, and the thickness D1 of the liquid crystal layer 130 above the second regions 122 is in the range of 0.1 μm to 20 μm as shown in FIG. 1.

The phase retardation of the liquid crystal molecules above the first regions 121 are offset against each other thereby to form an isotropic refractive index structure because of the protrusions 1211, therefore, the level of crosstalk interference result from the remained liquid crystal above the first regions 121 can be reduced.

In an embodiment of the present invention, the aligning micro-structures 222 on the bottom of second regions 220 are formed by, for example, such as micro-scratch alignment treatment, rubbing treatment, photo-alignment, $SiO_2$ evaporation, or ion beam alignment. In a preferred embodiment of the present invention, the aligning micro-structures 222 are formed when the patterned configuration layer 120 is formed by embossing the curable resin with a predetermined pattern of a grooved roller. The surface of grooved roller has predetermined patterned structures and micro-slot structures, the predetermined patterned structures are transferred to the curable resin to form the first regions 210 and the second regions 220, and the micro-slot structures are transferred to form the aligning micro-structures 222 on the bottom surface of second regions 220 during the embossing treatment. The method for forming the aligning micro-structures 222 is not limited thereto.

In an embodiment of the present invention, the material of liquid crystal layer 130 is polymerizable liquid crystal, such as RMS11-010 (available from Merck Display Tech Ltd, Taiwan), and the thickness D1 of the liquid crystal layer 130 above the second regions 122 is in the range of 0.1 μm to 20 μm, preferably in the range of 1.96 μm to 2.07 μm. In an embodiment of the present invention, the material of liquid crystal layer 130 is RMS11-010 (available from Merck Display Tech Ltd, Taiwan) and the thickness D1 of the liquid crystal layer 130 above the second regions 122 is 2 μm. In another embodiment of the present invention, the material of liquid crystal layer 130 is RHS09-080 (available from Merck Display Tech Ltd, Taiwan) and the thickness D1 of the liquid crystal layer 130 above the second regions 122 is 4.8 μm.

According to another aspect of the present invention, a method for manufacturing the patterned retarder film 100 is provided. FIGS. 3A to 3D illustrate the steps in a method for manufacturing a patterned retarder film 100 of an embodiment of the present invention.

Figure 3A:
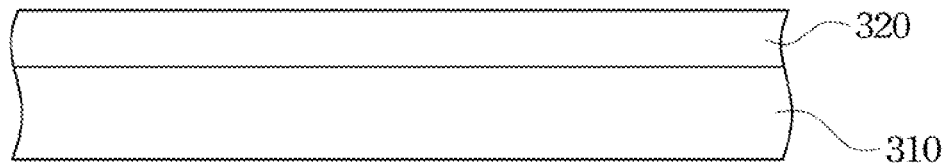
FIGS. 3A to 3E illustrate the steps in a method for manufacturing a patterned retarder film of an embodiment of the present invention.

Firstly, a substrate 310 is provided, as shown in FIG. 3A. The substrate 310 can be a poly(ethylene terephthalate) (PET), polycarbonate (PC), triacetyl cellulose (TAC), poly (methyl methacrylate) (PMMA) or cyclo-olefin polymer (COP).

As shown in FIG. 3A, a curable resin 320 is coated on the substrate 310. In an embodiment of the method of the present invention, the curable resin 320 is a UV curable resin or a thermo-curable resin as the mentioned above. The method of coating the curable resin 320 on the substrate 310 can be slit coating, roller coating or die coating.

According to an embodiment of the method of the present invention, the material used as curable resin 320 is penetrable by visible light preferably, such as acrylic resin, silicone and polyurethane.

Figure 3B:
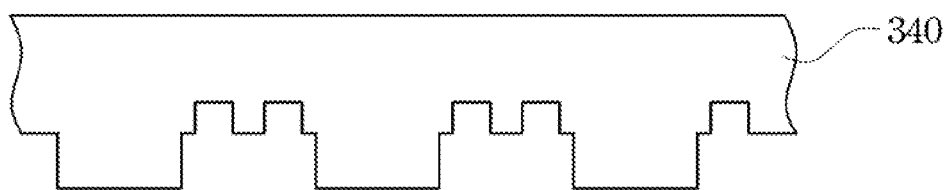
Figure 3C:
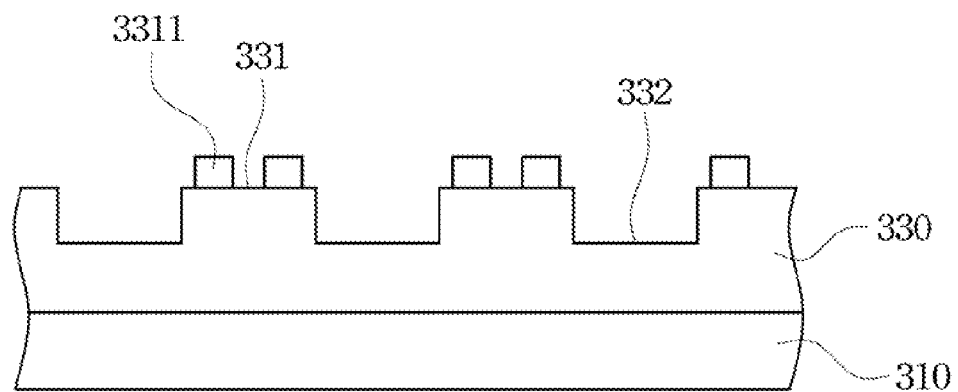

As shown in FIG. 3B, the patterned configuration layer 330 is formed by embossing the curable resin 320 with a predetermined pattern. The patterned configuration layer 330 comprises a plurality of first regions 331 and a plurality of second regions 332, wherein the structure of the first regions 331 and the second regions 332 is grating stripe structure, and are interlaced and parallel to each other. The first regions 331 relative to the second regions 332 has a relief structure. The first regions 331 have a plurality of protrusions 3311 on the top surface, the second regions 332 have a plurality of aligning micro-structures on the bottom surface, and the distance between the respective protrusions 3311 is in the range of 0.1 μm to 8 μm.

The embossing treatment is effected by a stamp or a roller having a predetermined pattern on the surface thereof. In an embodiment of the method of the present invention, the embossing treatment is effected by such as a grooved roller 340 as shown in FIG. 3B. The surface of the roller 340 is molded with a set of relief structures which are grating stripe structure, and are interlaced and parallel to each other. The structures on the surface of the grooved roller 340 are transferred to the curable resin layer 320 to form the patterned configuration layer 330. In brief, the patterned configuration layer 330 are corresponding to the structures on the surface of the grooved roller 340 so as to form the regions with different highness and aligning micro-structures. In another embodiment of the method of the present invention, the aligning micro-structures are formed, for example, by micro-scratch alignment treatment, rubbing treatment, photo-alignment, $SiO_2$ evaporation, or ion beam alignment.

After the embossing treatment, the patterned configuration layer 330 is cured. In an embodiment of the method of the present invention, the curable resin 320 is a UV curable resin and the patterned configuration layer 330 is in cured by UV radiation. In another embodiment of the method of the present invention, the curable resin 320 is a thermo-curable resin and the patterned configuration layer 330 is cured by heat treatment.

Figure 3D:
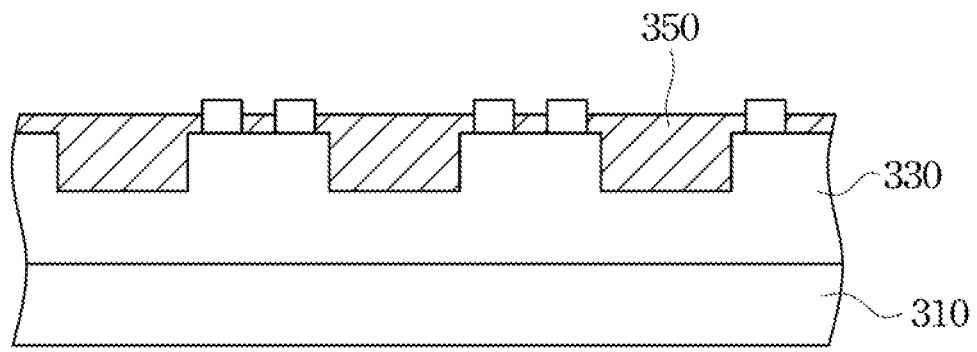

After the curing treatment, a liquid crystal layer 350 is formed on the cured patterned configuration layer 330 as shown in FIG. 3D. The method for forming the liquid crystal layer 350 is, for example, slit coating or other method which is known to an artisan skilled in the relevant art.

In an embodiment of the method of the present invention, the material of liquid crystal layer 350 is polymerizable liquid crystal and the thickness of the liquid crystal layer 350 above the second regions 332 is in the range of 0.1 μm to 20 μm, preferably in the range of 1.96 μm to 2.07 μm. In an embodiment of the method of the present invention, the material of liquid crystal layer 350 is RMS11-010 (available from Merck Display Tech Ltd, Taiwan) and the thickness of the liquid crystal layer 350 above the second regions 332 is 2 μm. In another embodiment of the method of the present invention, the material of liquid crystal layer 350 is RHS09-080 (available from Merck Display Tech Ltd, Taiwan) and the thickness of the liquid crystal layer 350 above the second regions 332 is 4.8 μm. The liquid crystal molecules above the first regions 331 arrange irregularly because of the protrusions 3311 on the top surface, and the liquid crystal molecules above the second regions 332 are aligned with the aligning micro-structures on the bottom surface. In an embodiment of the method of the present invention, after the liquid crystal layer 350 is coated on the cured patterned configuration layer 330, the liquid crystal layer 350 is cured by UV radiation. In another embodiment, the liquid crystal layer 350 is cured by heating treatment. Wherein, the liquid crystal layer 350 disposed above the first regions 331 provides a first phase retardation, the liquid crystal layer 350 above the second regions 332 provides a second phase retardation, and the difference between the first phase retardation and the second phase retardation is 180°.

Figure 3E:
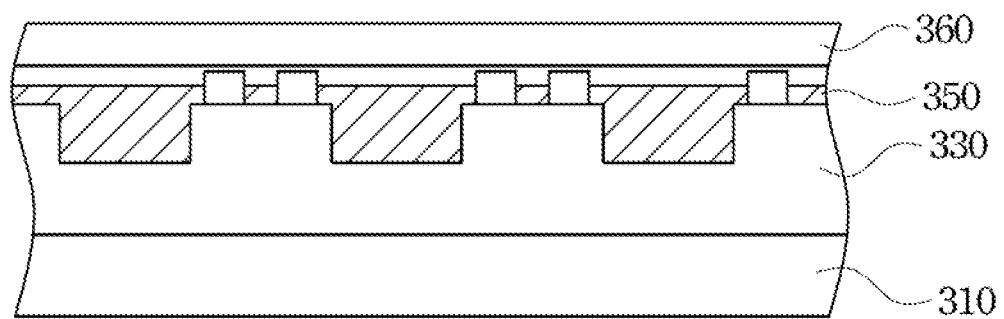

After the curing treatment, a ¼ wavelength plate 360 is adhered on the liquid crystal layer 350 as shown in FIG. 3E.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A patterned retarder film comprising:
    a substrate;
    a patterned configuration layer disposed on the substrate, comprising a plurality of first regions and a plurality of second regions, the first regions and the second regions being in a grating stripe structure and interlacedly parallel to each other, and the first regions relative to that of the second regions being in a relief structure, wherein the first regions have a top surface with a plurality of protrusions having a distance of 0.1 μm to 8 μm therebetween, and the second regions have a bottom surface with a plurality of aligning micro-structures; and
    a liquid crystal layer disposed on the patterned configuration layer, wherein liquid crystal molecules above the first regions are arranged irregularly because of the protrusions, and the liquid crystal molecules above the second regions are aligned with the aligning micro-structures;
    wherein the liquid crystal layer disposed above the first regions provides a first phase retardation, the liquid crystal layer above the second regions provides a second phase retardation, and the phase difference between the first phase retardation and the second phase retardation is 180°.

2. The patterned retarder film according to claim 1, wherein the substrate is selected from a group consisting of poly (ethylene terephthalate), polycarbonate, triacetyl cellulose, poly (methyl methacrylate), cyclo-olefin polymer, and a combination thereof.

3. The patterned retarder film according to claim 1, wherein the patterned configuration layer is formed by embossing a curable resin with a predetermined pattern.

4. The patterned retarder film according to claim 3, wherein the curable resin is selected from a group consisting of acrylic resin, silicone resin polyurethane, and a combination thereof.

5. The patterned retarder film according to claim 1, wherein the height of the protrusions is in the range of 0.5 μm to 6 μm.

6. The patterned retarder film according to claim 1, wherein the protrusions are cylindrical and have the diameter in the range of 0.1 μm to 20 μm.

7. The patterned retarder film according to claim 1, wherein the thickness of the liquid crystal layer above the second regions is in the range of 0.1 μm to 20 μm.

8. The patterned retarder film according to claim 1 further comprising a ¼ wavelength plate disposed on the liquid crystal layer.

9. A method of manufacturing a patterned retarder film, comprising the steps:
   providing a substrate;
   coating a curable resin on the substrate;
   embossing the curable resin to form a patterned configuration layer comprising a plurality of first regions and a plurality of second regions, the first regions and the second regions being in a grating stripe structure and interlacedly parallel to each other, and the first regions relative to the second regions being in a relief structure, wherein the first regions have a top surface with a plurality of protrusions having a distance of 0.1 μm to 8 μm therebetween, the second regions have a bottom surface with a plurality of aligning micro-structures;
   curing the patterned configuration layer;
   coating a liquid crystal layer on the patterned configuration layer, wherein liquid crystal molecules above the first regions is arranged irregularly because of the protrusions;
   aligning the liquid crystal molecules above the second regions with the aligning micro-structures; and
   curing the liquid crystal layer;
   wherein, the liquid crystal layer disposed above the first regions provides a first phase retardation, the liquid crystal layer above the second regions provides a second phase retardation, and the phase difference between the first phase retardation and the second phase retardation is 180°.

10. The method according to claim 9, further comprising the step of adhering a ¼ wavelength plate on the liquid crystal layer.

* * * * *